United States Patent
Lin et al.

(10) Patent No.: US 9,214,859 B2
(45) Date of Patent: Dec. 15, 2015

(54) CHARGE PUMP SYSTEM

(75) Inventors: Yung Feng Lin, Taoyuan County, Dasi Township (TW); Chun-Jen Huang, Tainan (TW); Tzeng-Huei Shiau, Hsin-Chu (TW); Chun-Hsiung Hung, Hsinchu (TW); Caiyun Wu, Jiangsu (CN); Qifang Wang, Suzou (CN)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 13/460,112

(22) Filed: Apr. 30, 2012

(65) Prior Publication Data

US 2013/0285737 A1    Oct. 31, 2013

(51) Int. Cl.
  *H02M 3/07*    (2006.01)
(52) U.S. Cl.
  CPC ........................................ *H02M 3/07* (2013.01)
(58) Field of Classification Search
  CPC ....... G11C 15/043; G11C 16/06; H02M 3/07; H02M 3/073
  USPC ...................................... 327/536; 363/59–60
  See application file for complete search history.

(56) References Cited

U.S. PATENT DOCUMENTS

| | | | | |
|---|---|---|---|---|
| 5,625,544 A * | 4/1997 | Kowshik et al. | ................. | 363/59 |
| 5,734,286 A * | 3/1998 | Takeyama et al. | ............. | 327/295 |
| 5,734,290 A * | 3/1998 | Chang et al. | ................... | 327/536 |
| 5,889,428 A * | 3/1999 | Young | ........................... | 327/536 |
| 6,100,557 A | 8/2000 | Hung et al. | | |
| 6,230,280 B1 * | 5/2001 | Okasaka | ....................... | 713/400 |
| 6,476,665 B2 * | 11/2002 | Buchschacher | ............... | 327/536 |
| 6,525,972 B2 * | 2/2003 | Yanagisawa | ............. | 365/189.09 |
| 6,560,145 B2 * | 5/2003 | Martines et al. | ......... | 365/185.18 |
| 6,573,780 B2 | 6/2003 | Lin et al. | | |
| 6,650,172 B1 * | 11/2003 | Shingyouchi | ................. | 327/536 |
| 6,683,809 B2 * | 1/2004 | Matsuda et al. | ......... | 365/185.18 |
| 6,768,366 B2 | 7/2004 | Kuo et al. | | |
| 6,914,791 B1 * | 7/2005 | Park et al. | ........................ | 363/60 |
| 7,098,725 B2 * | 8/2006 | Lee | ................. | 327/536 |
| 7,113,442 B2 * | 9/2006 | Kurihara | ....................... | 365/226 |
| 7,251,162 B2 * | 7/2007 | Kawajiri et al. | ......... | 365/185.18 |
| 7,323,926 B2 | 1/2008 | Chen et al. | | |
| 7,327,171 B2 * | 2/2008 | Wich | ............................ | 327/114 |
| 7,443,739 B2 * | 10/2008 | Barth | ....................... | 365/189.09 |
| 7,502,267 B2 * | 3/2009 | Lin et al. | ....................... | 365/201 |
| 7,525,853 B2 * | 4/2009 | Kitazaki et al. | ........... | 365/189.11 |
| 7,595,682 B2 * | 9/2009 | Lin et al. | ........................ | 327/536 |
| 7,808,301 B2 | 10/2010 | Chen et al. | | |
| 7,944,718 B2 * | 5/2011 | Takano | .......................... | 363/59 |
| 8,339,185 B2 * | 12/2012 | Cazzaniga et al. | ............. | 327/536 |
| 2007/0096796 A1 * | 5/2007 | Firmansyah et al. | ......... | 327/536 |
| 2007/0126494 A1 * | 6/2007 | Pan | ............................... | 327/538 |

(Continued)

FOREIGN PATENT DOCUMENTS

| | | |
|---|---|---|
| CN | 1173023 A | 2/1998 |
| CN | 101317320 A | 12/2008 |
| TW | 201008098 A1 | 2/2010 |

*Primary Examiner* — Thomas J Hiltunen
(74) *Attorney, Agent, or Firm* — Kenta Suzue; Haynes Beffel & Wolfeld LLP (57) ABSTRACT

In one aspect, a first charge pump has serially arranged charge pump stages. Inter-stage nodes between adjacent stages are pumped by a second charge pump. In another aspect, timing of the charge pump stages is controlled by at a command clock signal. The command clock signal and command data are communicated between a integrated circuit with the charge pump and an external circuit.

14 Claims, 7 Drawing Sheets

(56) References Cited

U.S. PATENT DOCUMENTS

| | | | |
|---|---|---|---|
| 2009/0108915 A1* | 4/2009 | Liao | 327/536 |
| 2010/0237931 A1* | 9/2010 | Ogiwara et al. | 327/536 |
| 2011/0115551 A1* | 5/2011 | Hung et al. | 327/536 |
| 2012/0049937 A1* | 3/2012 | El Waffaoui | 327/536 |
| 2012/0275225 A1* | 11/2012 | Huynh et al. | 365/185.17 |
| 2013/0027120 A1* | 1/2013 | Lo et al. | 327/536 |
| 2013/0127436 A1* | 5/2013 | Hu et al. | 323/304 |

* cited by examiner

Fig. 8

CHARGE PUMP SYSTEM

BACKGROUND

1. Field of the Invention

This technology relates to charge pumps and charge pump clocking.

2. Description of Related Art

A four phase charge pump system is a power efficient design that addresses problems with threshold voltage dependence. Such four phase charge pump systems are associated with relatively long setup times. Setup time requirements generally become more demanding with increased operation speeds.

A performance metric for a memory integrated circuit is the time elapsed between receiving a command to perform a read operation, and actually performing the read operation. From the time that a read command is received by the integrated circuit, setup time is required for the four phase clock and additional setup time is required for the active charge pump. Setup time for the multi-phase clock signal effectively takes away from available setup time for the active charge pump. Setup time for the active charge pump is lengthened by leakage current from the internal nodes of an active charge pump.

SUMMARY

One aspect of the technology is an apparatus including a first charge pump and a second charge pump.

The first charge pump includes a plurality of serially arranged charge pump stages, and inter-stage nodes between adjacent stages. The plurality of serially arranged charge pump stages of the first charge pump are arranged to pump a voltage level from a first stage to a last stage of the first charge pump.

The second charge pump is coupled to one or more of the inter-stage nodes of the first charge pump. The second charge pump is arranged to pump one or more voltage levels of the one or more of the inter-stage nodes of the first charge pump. The second charge pump includes a plurality of serially arranged charge pump stages of the second charge pump arranged to pump a second voltage level from a first stage to a last stage of the second charge pump.

In one embodiment, the first charge pump is driven by a two-phase clock including a first clock signal and a second clock signal. The first clock signal and the second clock signal are differently delayed versions of an input clock signal. The input clock signal is undedicated to charge pumping.

In one embodiment, the first charge pump is driven by clock signals that are nonoverlapping, such that parts of the clock signals that activate the charge pump stages are nonoverlapping.

In one embodiment, the first charge pump is driven by clock signals having a duty cycle less than half, such that parts of the clock signals that activate the charge pump stages are less than half of the clock signals.

In one embodiment, the first charge pump is driven by clock signals that are differently delayed versions of an input clock signal, and the input clock signal has a duty cycle less than half, such that parts of the input clock signal that activate the charge pump stages are less than half of the input clock signal.

In one embodiment, the first charge pump is driven by a two-phase clock including a first clock signal and a second clock signal. The first clock signal and the second clock signal are delayed versions of an input clock signal. The second charge pump is driven by a four-phase clock. The second charge pump can be a standby charge pump driven by an internally generated four-phase clock, as the second charge pump does not face the setup time requirements of the first charge pump which can be an active charge pump.

One embodiment further comprises control circuitry that compensates for leakage from the one or more of the inter-stage nodes with charge pumping of the one or more of the inter-stage nodes by the second charge pump having a second plurality of serially arranged charge pump stages.

In one embodiment, an output of the first charge pump provides a word line read voltage.

In one embodiment, pumping frequency of the first charge pump is determined by an input clock signal undedicated to charge pumping.

In various embodiments, the input clock signal is, for example, an external command clock which clocks external data that is communicated with the integrated circuit that includes the charge pumps.

One aspect of the technology is a method comprising:
  pumping one or more voltage levels of one or more inter-stage nodes between adjacent stages of a plurality of serially arranged charge pump stages of a first charge pump, with a second charge pump.

In one embodiment, the first charge pump is driven by a two-phase clock including a first clock signal and a second clock signal. The first clock signal and the second clock signal are differently delayed versions of an input clock signal undedicated to charge pumping. For example, the input clock signal is an external command clock which clocks external data that is communicated with the integrated circuit that includes the charge pumps.

In one embodiment, the first charge pump is driven by a two-phase clock including a first clock signal and a second clock signal. The first clock signal and the second clock signal are delayed versions of an input clock signal. The second charge pump is driven by a four-phase clock.

One embodiment further comprises:
  compensating for leakage from the one or more of the inter-stage nodes with charge pumping of the one or more of the inter-stage nodes by the second charge pump.

In one embodiment, an output of the first charge pump provides a word line read voltage.

In one embodiment, pumping frequency of the first charge pump is determined by an input clock signal undedicated to charge pumping.

In various embodiments, the input clock signal is, for example, an external command clock which clocks external data that is communicated with the integrated circuit that includes the charge pumps.

One aspect of the technology is an apparatus comprising an integrated circuit. The integrated circuit includes electrical connectors and a charge pump.

The electrical connectors communicate signals including a command clock and command data between the integrated circuit and an external circuit. The charge pump includes a plurality of serially arranged charge pump stages arranged to pump a voltage level from a first stage to a last stage. Timing of the charge pump stages is controlled by at least the command clock signal.

One aspect of the technology is a method comprising:
  communicating signals between an integrated circuit and an external circuit through electrical connectors of the integrated circuit, the signals including a command clock and command data clocked by the command clock; and controlling timing of charge pump stages of a charge pump in the integrated circuit by at least the command clock signal.

DETAILED DESCRIPTION

Figure 1:
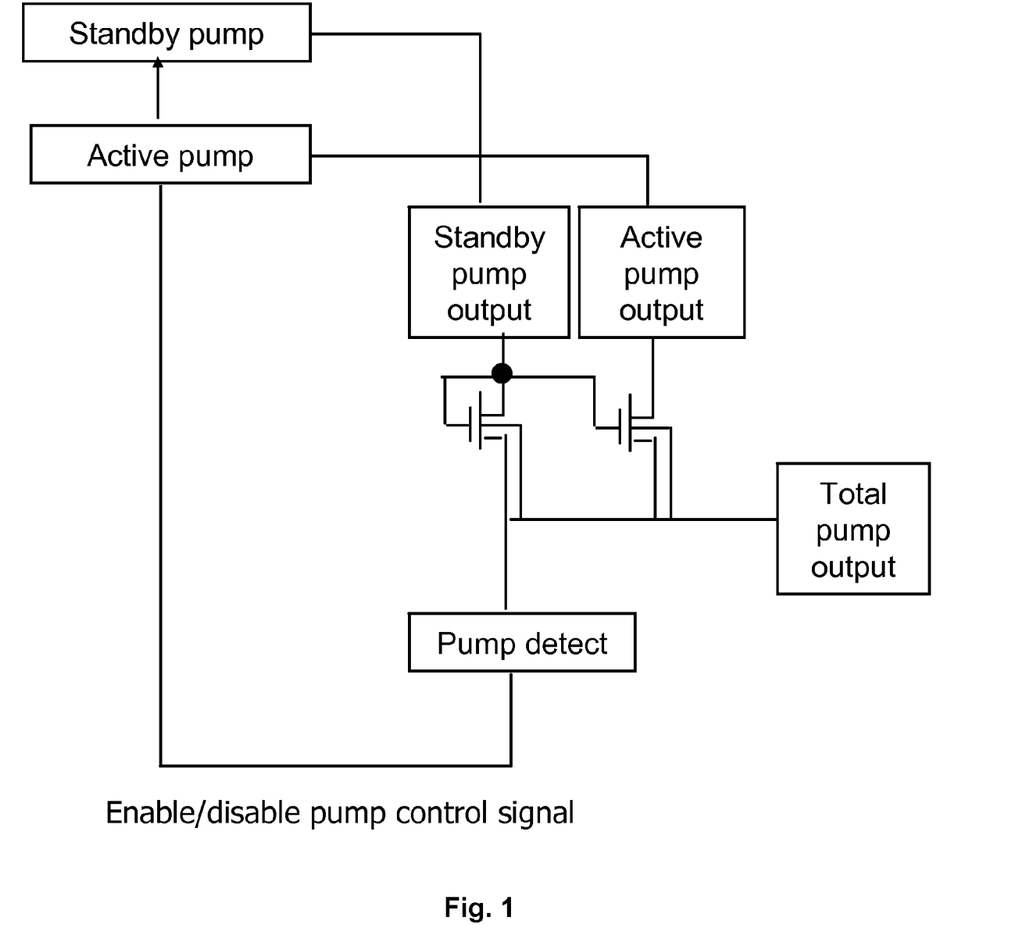
FIG. 1 is a block diagram of a charge pump system.

FIG. 1 is a block diagram of a charge pump system.

In response to a read command, the active charge pump and the standby charge pump are enabled by an "enable pump" control signal to active charge pump and the standby charge pump. The charge pump outputs of the standby charge pump and the active charge pump are combined at the total charge pump output. After the read command, the active charge pump and the standby charge pump are disabled by a "disable pump" control signal to active charge pump and the standby charge pump.

To perform the read command every N clock cycles, the active charge pump consumes standby pumping power which was saved over the prior N clock cycles. After the read command, standby pumping power is saved again over the next N clock cycles for the next read command.

Figure 2:
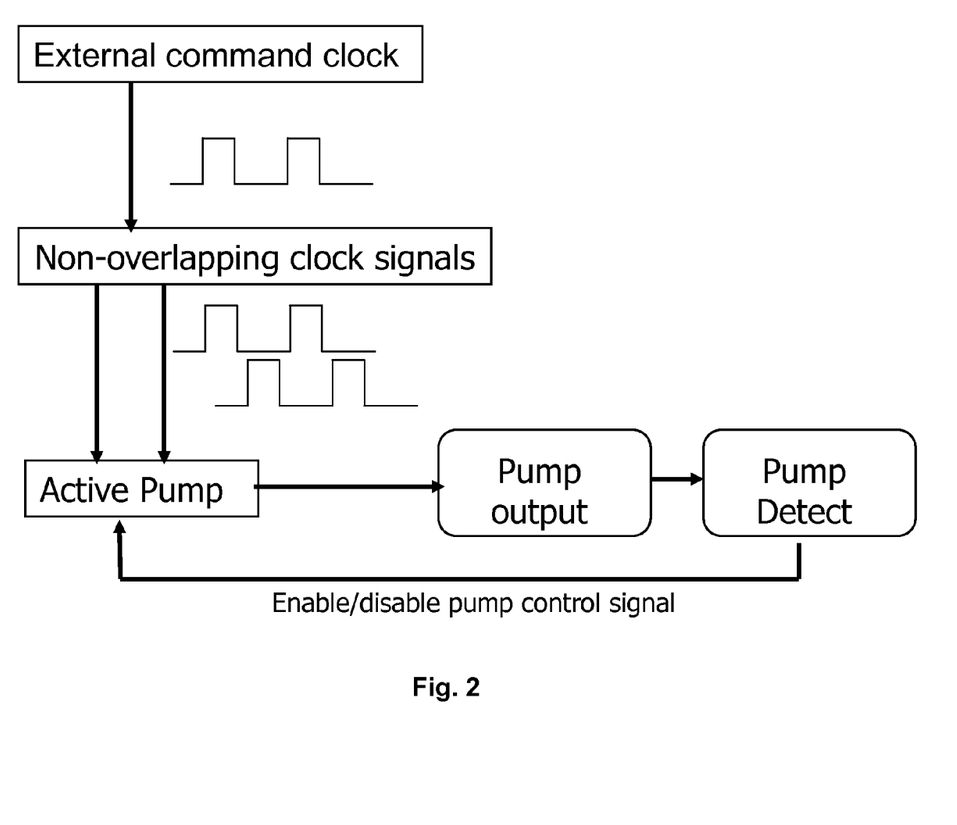
FIG. 2 is a diagram showing the external source of the clock signals for the active charge pump.

FIG. 2 is a diagram showing the external source of the clock signals for the active charge pump.

The active charge pump in the integrated circuit is clocked by an external command clock. The external command clock is a signal that also clocks the command data signal. The command clock signal and command data signals are communicated between an integrated circuit and an external circuit (external to the integrated circuit). Because the active charge pump in the integrated circuit is clocked by an external command clock, in response to a read command there setup time is saved which would otherwise be spent generating the clock signals of the active charge pump.

Figure 3:
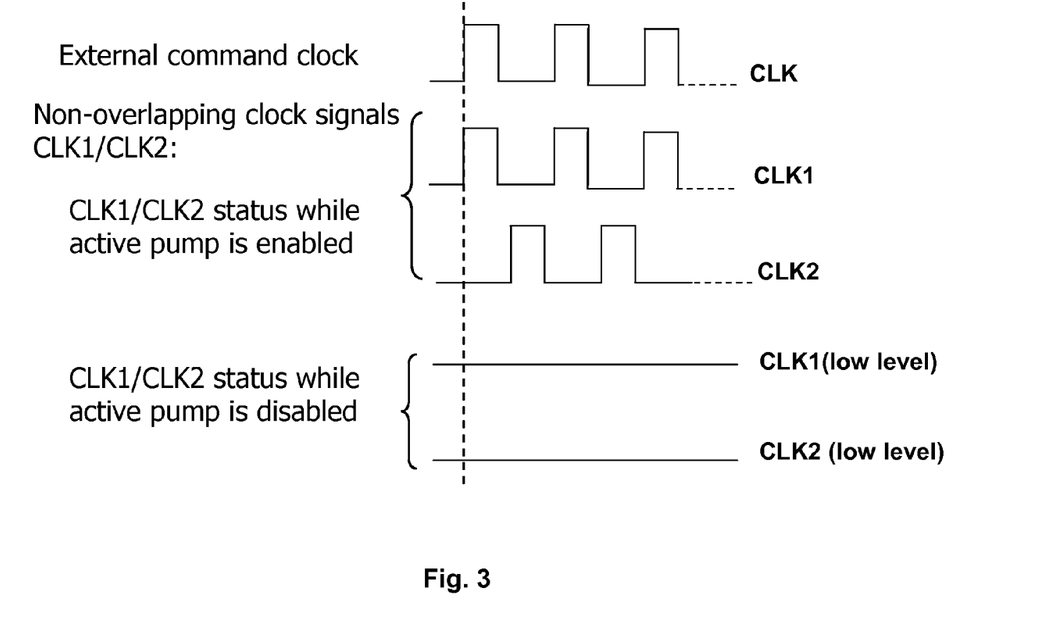
FIG. 3 shows the non-overlapping clock signals for the active charge pump.

FIG. 3 shows the non-overlapping clock signals for the active charge pump.

The active charge pump is clocked by non-overlapping clock signals. A first clock signal CLK1 of the active charge pump is the external command clock signal. A second clock signal CLK2 of the active charge pump is a delayed version of the external command clock signal. In another embodiment, both the first clock signal CLK1 and the second clock signal CLK2 of the active charge pump are delayed versions of the external command clock signal.

When the active charge pump is disabled, both the first clock signal CLK1 and the second clock signal CLK2 of the active charge pump are off.

Setup of the non-overlapping clock signals is relatively fast, also because of the shorter clock period for a two-phase clock than for a four-phase clock.

Figure 4:
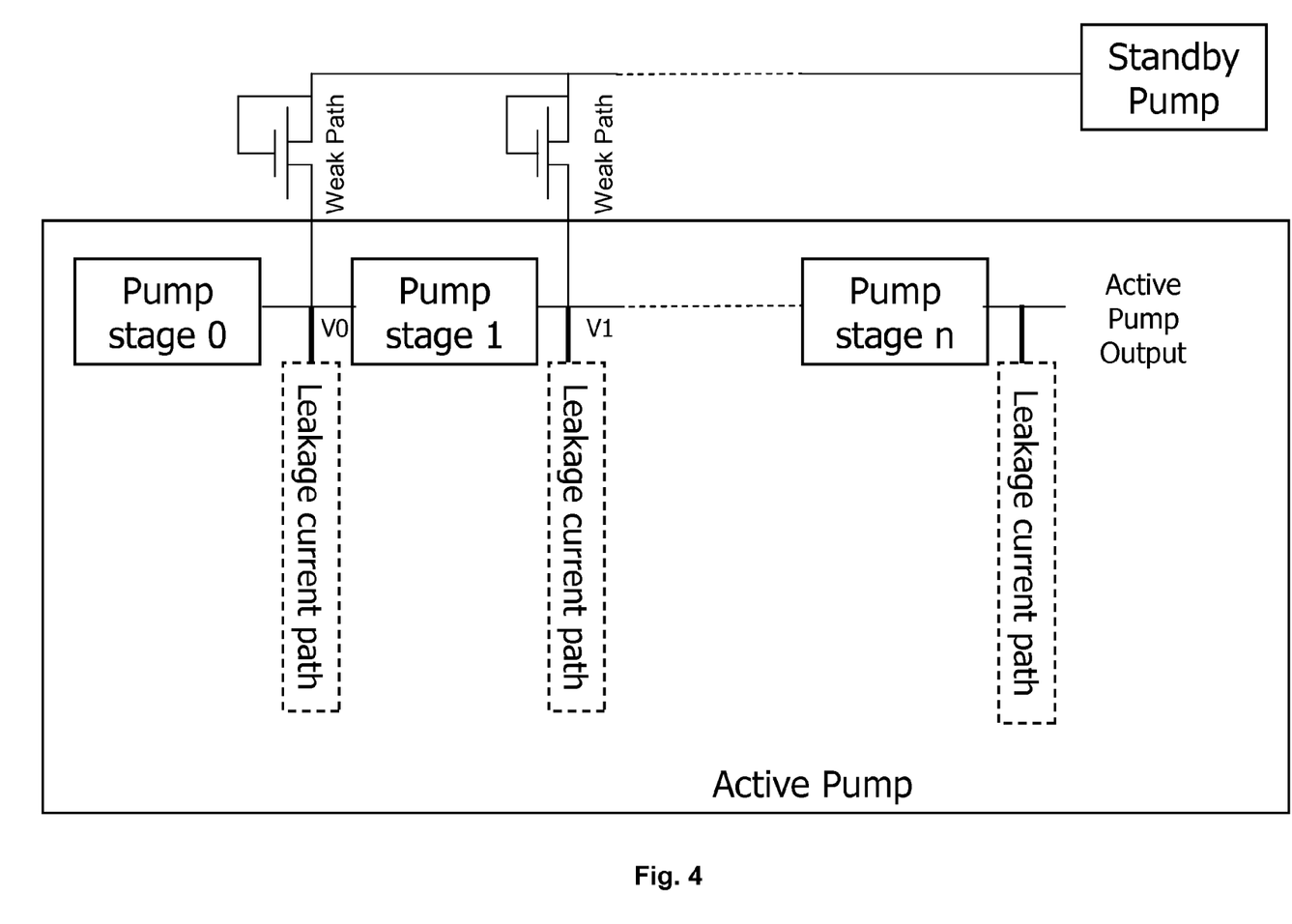
FIG. 4 is a block diagram of the active charge pump, with intermediate nodes supported by the standby charge pump.

FIG. 4 is a block diagram of the active charge pump, with intermediate nodes supported by the standby charge pump.

The active charge pump has multiple serially arranged charge pump stages, Pump stage 0, Pump stage 1, . . . , through Pump stage n. Inter-stage nodes V0, V1, etc., are between adjacent stages. Inter-stage node V0 is at the output of Pump stage 0. Inter-stage node V0 is also at the input of Pump stage 1. Inter-stage node V1 is at the output of Pump stage 1. Inter-stage node V1 is also at the input of Pump stage 2 (not shown). Generally, an inter-stage node Vx is at the output of Pump stage x and also at the input of Pump stage x+1. The output of the last pump stage is the Active Pump Output.

The inter-stage nodes of the active charge pump suffer a leakage current path which tends to lower the voltage levels of the inter-stage nodes. To help assure that the active charge pump will work as controlled by the external command clock, the voltage levels of the internal nodes of the active charge pump are supported by the standby charge pump. The frequency of various read command modes is near DC, occurring no more than every N clock cycles.

To counteract the leakage, the standby charge pump is connected to the inter-stage nodes V0, V1, . . . etc. of the active charge pump. A weak pull-up transistor between the standby charge pump and an inter-stage node forms a "weak path" which pulls up the voltage level of the inter-stage node. The weak pull-up transistor has gate and drain terminals coupled to the standby charge pump output, and a source terminal coupled to the inter-stage node. The inter-stage nodes V0, V1, . . . etc. of the active charge pump are pumped to the standby charge pump output decreased by one diode threshold voltage for the diode-connected transistor. Those inter-stage nodes that are internal to the active charge pump, which are more, at, or near the level of charge pump output decreased by one diode threshold voltage, are supported by the standby charge pump. The diode connections ensure that the standby charge pump supports the inter-stage nodes that are internal to the active charge pump, while also ensuring that the inter-stage nodes that are internal to the active charge pump cannot affect the standby pumping.

Figure 5:
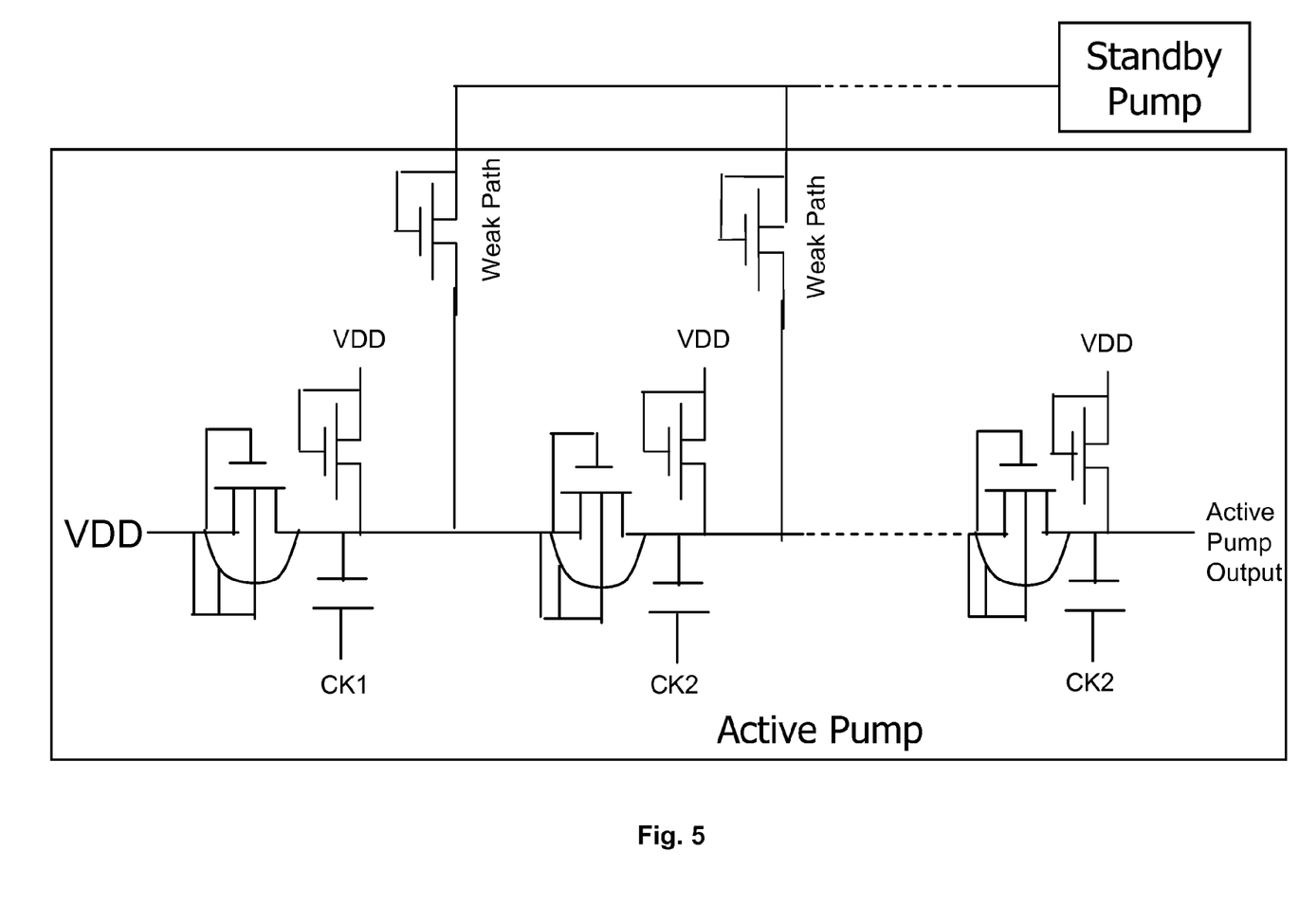
FIG. 5 is a more detailed diagram of the active charge pump, with intermediate nodes supported by the standby charge pump.

FIG. 5 is a more detailed diagram of the active charge pump, with intermediate nodes supported by the standby charge pump.

The active charge pump stages have triple well transistors. In an embodiment with triple well NMOS transistors, the N+ source and N+ drain are formed in a p-well. The p-well is formed in an n-well. The n-well is formed in a p-type substrate. Further details are disclosed in U.S. Pat. No. 6,100,557, incorporated by reference herein.

Alternating stages of the active charge pump are clocked by alternating ones of the first and second clock signals CLK1 and CLK2. For example, "even" active charge pump stages, Pump stage 0, Pump stage 2, etc. are pumped by clock signal CLK1; and "odd" active charge pump stages, Pump stage 1, Pump stage 3, etc. are pumped by clock signal CLK2. In another embodiment, the "even" active charge pump stages are pumped by clock signal CLK2; and "odd" active charge pump stages are pumped by clock signal CLK1.

The active charge inter-stage nodes have pull-up transistors to supply voltage VDD. The pull-up transistor has gate and drain terminals coupled to the standby charge pump output, and a source terminal coupled to the inter-stage node.

Figure 6:
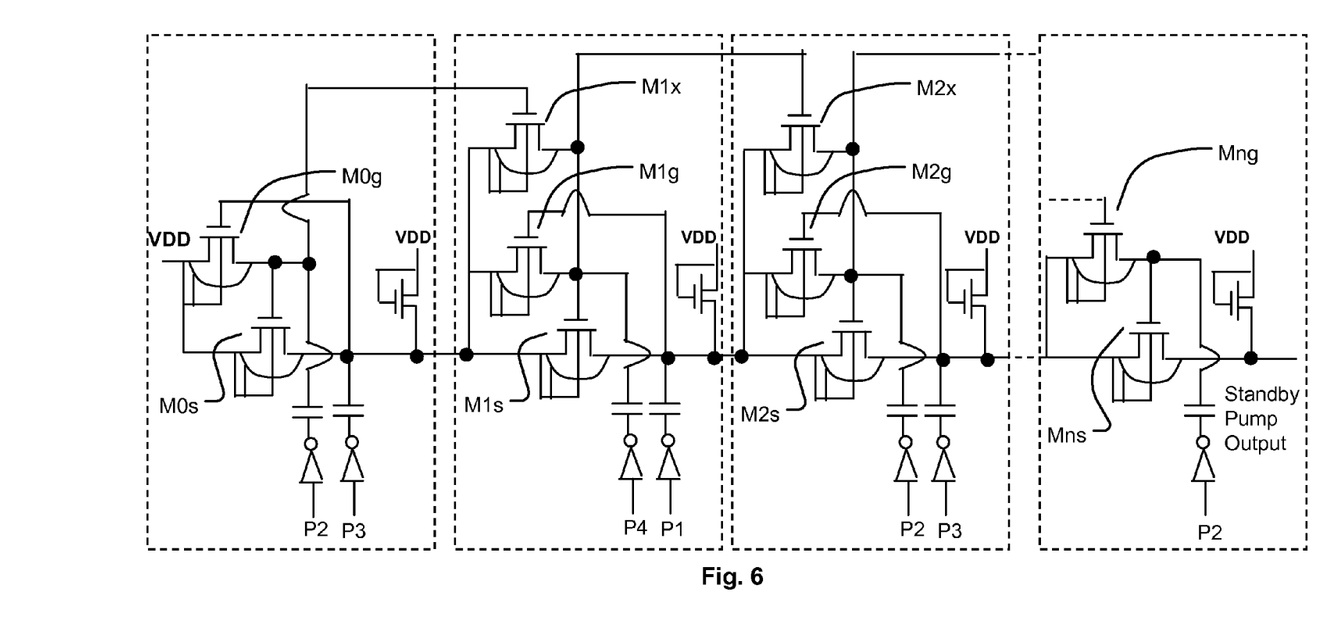
FIG. 6 is a diagram of the standby charge pump.
Figure 7:
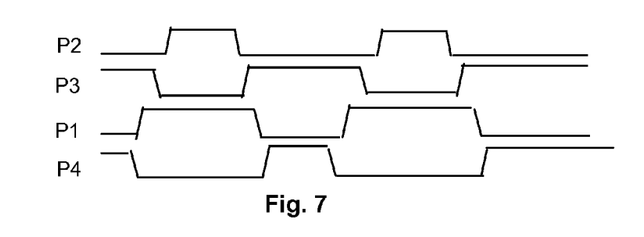
FIG. 7 is a timing diagram of the clock signals for the standby charge pump.

FIG. 6 is a diagram of the standby charge pump. FIG. 7 is a timing diagram of the clock signals for the standby charge pump of FIG. 6.

Alternating active pump stage switches of the active charge pump are clocked by alternating ones of the clock signals P2 and P4. For example, "even" pump stage switches M0s, M2s, etc. of the active charge pump are clocked by clock signal P2; and "odd" pump stage switches M1s, M3s, etc. of the active charge pump are clocked by clock signal P4.

Alternating inter-stage nodes and gate boosting transistors of the active charge pump are clocked by alternating ones of the clock signals P3 and P1. For example, "even" inter-stage nodes and gate boosting transistors M0g, M2g, etc. of the active charge pump are pumped by clock signal P3; and "odd" inter-stage nodes and gate boosting transistors M1g, M3g, etc. of the active charge pump are pumped by clock signal P1.

The transistors M1x and M2x prevent the pump stages from shifting voltage levels due to transistors M1s and M2s.

Figure 8:
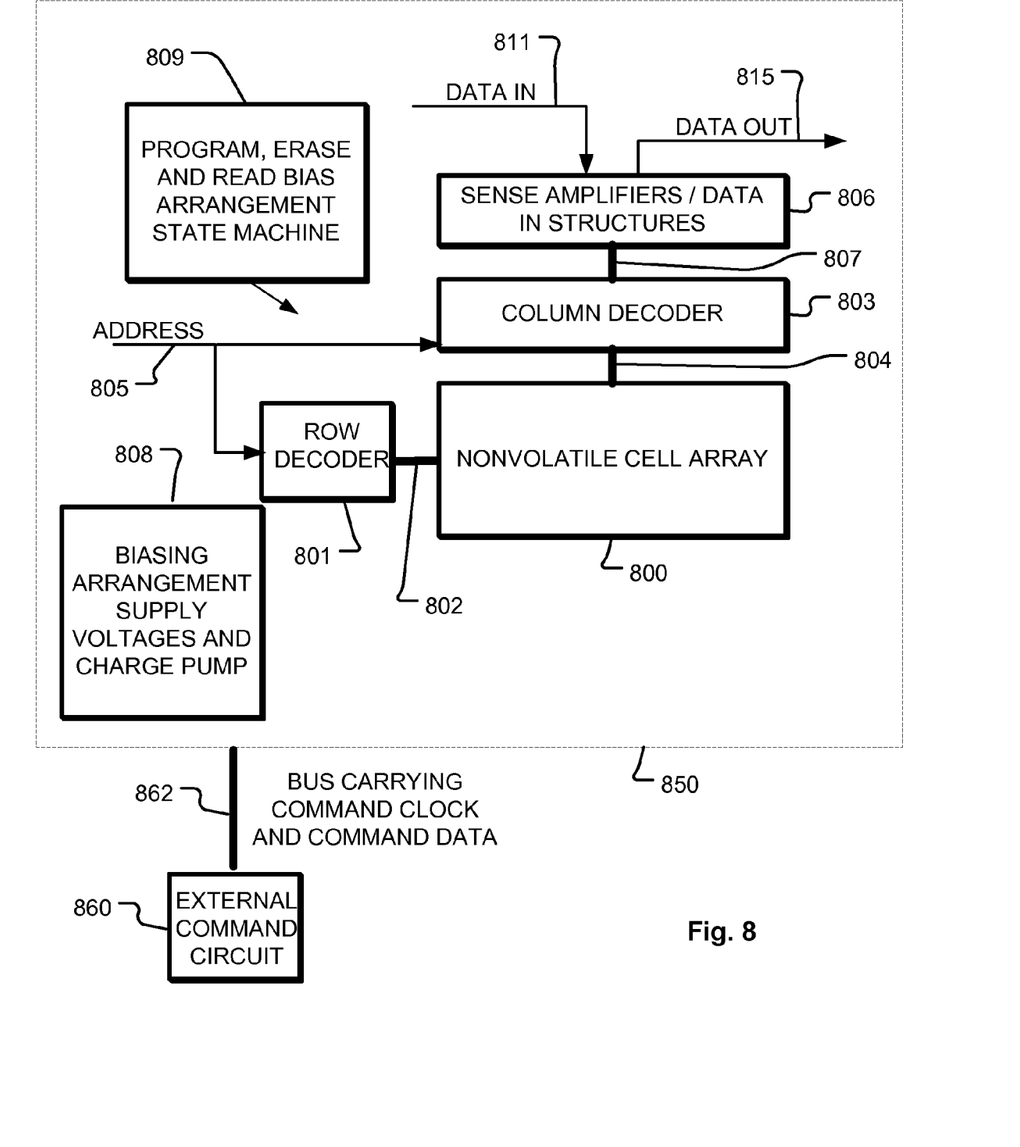
FIG. 8 is a block diagram of an integrated circuit with the disclosed charge pump system.

FIG. 8 is a block diagram of an integrated circuit with the disclosed charge pump system.

An integrated circuit 850 includes a memory array 800. A word line decoder 801 is coupled to and in electrical communication with a plurality of word lines 802 arranged along rows in the memory array 800. A bit line (column) decoder 803 is in electrical communication with a plurality of bit lines 804 arranged along columns in the array 800. Addresses are supplied on bus 805 to the word line decoder 801 and bit line decoder 803. Sense circuitry (Sense amplifiers) and data-in structures in block 806, including voltage and/or current sources are coupled to bit line decoder 803 via data bus 807. Data is supplied via a data-in line 811 from input/output ports on integrated circuit 850, or from other data sources internal or external to integrated circuit 850, to data-in structures in block 806. Other circuitry may be included on integrated circuit 850, such as a general purpose processor or special purpose application circuitry, or a combination of modules providing system-on-a-chip functionality supported by array 800. Data is supplied via a data-out line 815 from the sense amplifiers in block 806 to input/output ports on integrated circuit 850, or to other data destinations internal or external to integrated circuit 850.

A controller 809 implemented in this example, using a bias arrangement state machine, controls the application of charge pump circuitry, bias circuitry voltage and current sources 808 for the application of bias arrangements including read, program, erase, erase verify and program verify voltages and/or currents for the word lines and bit lines. The charge pump circuitry supports inter-stage nodes of an active charge pump with a standby charge pump. Controller 809 may be implemented using special-purpose logic circuitry as known in the art. In alternative embodiments, controller 809 comprises a general-purpose processor, which may be implemented on the same integrated circuit to execute a computer program to control the operations of the device. In yet other embodiments, a combination of special-purpose logic circuitry and a general-purpose processor may be utilized for implementation of controller 809.

An external command circuit 860 communicates a command clock signal and command data signal over bus 862. An example of a command data signal is a read command and memory address to be read by the read command. By making use of the command clock signal to clock the active charge pump, the active charge pump saves on setup time which would otherwise be spent in generating a comparable clock signal. Pump frequency aligns automatically with the command clock signal.

In one embodiment, a command code over bus 862 (such as serial peripheral interface) aligns the integrated circuit 850 to the command clock signal sent over bus 862.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An integrated circuit, comprising:
a first charge pump including:
a plurality of serially arranged charge pump stages of the first charge pump arranged to pump a first voltage level from a first stage to a last stage of the first charge pump; and
inter-stage nodes between adjacent stages of the plurality of serially arranged charge pump stages; and
a second charge pump coupled to one or more of the inter-stage nodes of the first charge pump, the second charge pump arranged to pump one or more voltage levels of the one or more of the inter-stage nodes of the first charge pump, the second charge pump including:
a plurality of serially arranged charge pump stages of the second charge pump arranged to pump a second voltage level from a first stage to a last stage of the second charge pump,
wherein an input clock signal received by the integrated circuit (i) determines a pumping frequency of the first charge pump, and (ii) clocks data including memory commands and memory addresses received by the integrated circuit; and
a control circuit generating a signal to enable the first charge pump in response to a read command, and providing the output of the first charge pump as a word line read voltage to a word line on the integrated circuit,
wherein the first charge pump has a first pump output, the second charge pump has a second pump output, the first pump output and the second pump output are coupled in parallel to a total pump output, the first pump output coupled to the total pump output via a first transistor with a fixed diode configuration.

2. The integrated circuit of claim 1, wherein the first charge pump is driven by a two-phase clock including a first clock signal and a second clock signal, wherein the first clock signal and the second clock signal are differently delayed versions of an input clock signal undedicated to charge pumping.

3. The integrated circuit of claim 1, wherein the first charge pump is driven by clock signals that are nonoverlapping, such that parts of the clock signals that activate the charge pump stages are nonoverlapping.

4. The integrated circuit of claim 1, wherein the first charge pump is driven by clock signals having a duty cycle less than half, such that parts of the clock signals that activate the charge pump stages are less than half of the clock signals.

5. The integrated circuit of claim 1, wherein the first charge pump is driven by clock signals that are differently delayed versions of an input clock signal, and the input clock signal has a duty cycle less than half, such that parts of the input clock signal that activate the charge pump stages are less than half of the input clock signal.

6. The integrated circuit of claim 1, wherein the first charge pump is driven by a two-phase clock including a first clock signal and a second clock signal, wherein the first clock signal and the second clock signal are delayed versions of an input clock signal, and wherein the second charge pump is driven by a four-phase clock.

7. The integrated circuit of claim 1, further comprising control circuitry that compensates for leakage from the one or more of the inter-stage nodes with charge pumping of the one or more of the inter-stage nodes by the second charge pump.

8. A method comprising:
receiving, at an integrated circuit, an input clock signal that (i) determines a pumping frequency of the first charge pump, and (ii) clocks data including memory commands and memory addresses received by the integrated circuit; and
pumping, on the integrated circuit, one or more voltage levels of one or more inter-stage nodes between adjacent stages of a first plurality of serially arranged charge pump stages of a first charge pump, with a second charge pump having a second plurality of serially arranged charge pump stages;
enabling the first charge pump in response to a read command; and
providing, from the output of the first charge pump, a word line read voltage,
wherein the first charge pump has a first pump output, the second charge pump has a second pump output, the first pump output and the second pump output are coupled in parallel to a total pump output, the first pump output coupled to the total pump output via a first transistor with a fixed diode configuration.

9. The method of claim 8, wherein the first charge pump is driven by a two-phase clock including a first clock signal and a second clock signal, wherein the first clock signal and the second clock signal are differently delayed versions of an input clock signal undedicated to charge pumping.

10. The method of claim 8, wherein the first charge pump is driven by clock signals that are nonoverlapping, such that parts of the clock signals that activate the charge pump stages are nonoverlapping.

11. The method of claim 8, wherein the first charge pump is driven by clock signals having a duty cycle less than half, such that parts of the clock signals that activate the charge pump stages are less than half of the clock signals.

12. The method of claim 8, wherein the first charge pump is driven by clock signals that are differently delayed versions of an input clock signal, and the input clock signal has a duty cycle less than half, such that parts of the input clock signal that activate the charge pump stages are less than half of the input clock signal.

13. The method of claim 8, wherein the first charge pump is driven by a two-phase clock including a first clock signal and a second clock signal, wherein the first clock signal and the second clock signal are delayed versions of an input clock signal, and wherein the second charge pump is driven by a four-phase clock.

14. The method of claim 8, further comprising:
compensating for leakage from the one or more of the inter-stage nodes with charge pumping of the one or more of the inter-stage nodes by the second charge pump.

* * * * *